(12) United States Patent
Drouet et al.

(10) Patent No.: US 8,849,918 B2
(45) Date of Patent: Sep. 30, 2014

(54) ELECTRONIC MAIL MANAGEMENT SYSTEM

(75) Inventors: Francois-Xavier Drouet, La Gaude (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 11/136,206

(22) Filed: May 24, 2005

(65) Prior Publication Data

US 2006/0031356 A1 Feb. 9, 2006

(30) Foreign Application Priority Data

Jun. 11, 2004 (EP) .................................... 04368042

(51) Int. Cl.
*G06F 15/16* (2006.01)
*G06F 7/00* (2006.01)
*G06F 3/00* (2006.01)
*G06Q 10/10* (2012.01)

(52) U.S. Cl.
CPC .................................. *G06Q 10/107* (2013.01)
USPC ........... 709/206; 709/204; 709/205; 709/207; 707/778; 707/786; 715/700; 715/752

(58) Field of Classification Search
USPC ............ 709/204–207; 707/200; 715/733–759
See application file for complete search history.

(56) References Cited

U.S. PATENT DOCUMENTS

| | | | |
|---|---|---|---|
| 5,040,141 A | 8/1991 | Yazima et al. | |
| 5,548,789 A * | 8/1996 | Nakanura | 709/206 |
| 6,704,772 B1 * | 3/2004 | Ahmed et al. | 709/207 |
| 6,826,596 B1 * | 11/2004 | Suzuki | 709/206 |
| 2002/0099777 A1 * | 7/2002 | Gupta et al. | 709/206 |
| 2004/0054737 A1 * | 3/2004 | Daniell | 709/206 |

* cited by examiner

*Primary Examiner* — Ranodhi Serrao
*Assistant Examiner* — Farrukh Hussain
(74) *Attorney, Agent, or Firm* — Andrea Bauer; Hoffman Warnick LLC

(57) ABSTRACT

An electronic mail management system and method is disclosed comprising a control table for storing information related to sent and received messages of an email client, wherein the stored information relates to header fields of the received and sent messages and, in particular, to fields as defined in Internet Engineering Task Force standard RFC 2822. The system monitors the control table to identify received messages which relate to sent messages and also to identify sent messages which have not been responded to by the recipients of the sent message. The email client displays received messages stored in the control table hierarchically according to the related sent message and also displays the status of the messages in the control table.

17 Claims, 4 Drawing Sheets

CONTROL TABLE

| MSG-ID | LIST OF RECIPIENT | STATUS | CONTENT MODIFIED | CHECK DATE |

40

ELECTRONIC MAIL MANAGEMENT SYSTEM

TECHNICAL FIELD

The present invention relates to a method of and systems for managing electronic mail (email) messages and particularly, but not exclusively, for tracking related email messages. One email message may be related to another, for example, because it is a reply to the other.

BACKGROUND

Email has become a critical communications service. For many individuals, the volume of received email messages is becoming extremely difficult to manage on a day-to-day basis. The increasing volume of messages can make it difficult to follow the thread of an email conversation or discussion. For example, if a message is sent asking a question to a number of recipients, it may be difficult to ensure that all the recipients have answered the question simply by looking at the messages received.

Typically, client email systems can organise email by a number of factors such as date received, sender or subject heading. Many email systems also enable a series of rules to perform functions on each message depending on the information in the message header or body. For instance, a message may be placed in a certain email folder if received from a particular sender.

Rules are globally applied to all received emails and any message which conforms to a particular rule has a function applied to it. Therefore, rules cannot relate to a particular sent message and therefore do not help to relate received messages to sent messages.

U.S. Pat. No. 5,040,141 discloses a system for administering email having an email client which stores information relating to a message in a table according to whether an answer is required to the message. The email client is required for both sender and recipient to enable the system to function.

Email message fields are defined by the Internet Engineering Task Force email standard RFC 2822. This standard sets out the format for messages to ensure parity across networks and to enable any email client to correctly interpret messages. Similarly, RFC 2821 sets out the standard for the Simple Mail Transport Protocol (SMTP), which governs the sending and propagation of email in a network.

SUMMARY OF THE INVENTION

The present invention provides a method of and systems for managing email that make it less difficult to track related email messages and therefore follow the thread of an email conversation.

According to a first aspect of the present invention there is provided a method of managing email messages comprising the steps of:
  sending at least one sent message having a plurality of sent fields;
  storing information from at least one of the plurality of sent fields of the at least one sent message;
  receiving at least one received message having a plurality of received fields; and
  comparing information from at least one of the plurality of received fields with the stored information to identify if the at least one sent message relates to the at least one received message.

According to a second aspect of the present invention there is provided an email content management system comprising:
  means for storing information relating to at least one sent message having a plurality of sent fields; and
  means for comparing at least one received message having a plurality of received fields to the stored information to identify if the at least one received message relates to the at least one sent message.

According to a third aspect of the present invention there is provided an email client system having an email content management system according to the second aspect of the invention.

According to a fourth aspect of the present invention there is provided a computer program product directly loadable into an internal memory of a digital computer comprising software code portions for performing the steps of the first aspect of the invention when said product is run on a computer.

According to a fifth aspect of the present invention there is provided a computer system comprising an execution environment for running an application and an email client system having an email content management system according to the second aspect of the invention.

BRIEF DESCRIPTION OF THE DRAWINGS

Embodiments of the present invention will now be described with reference to the accompanying drawings, in which.

DETAILED DESCRIPTION OF THE INVENTION

Figure 1:
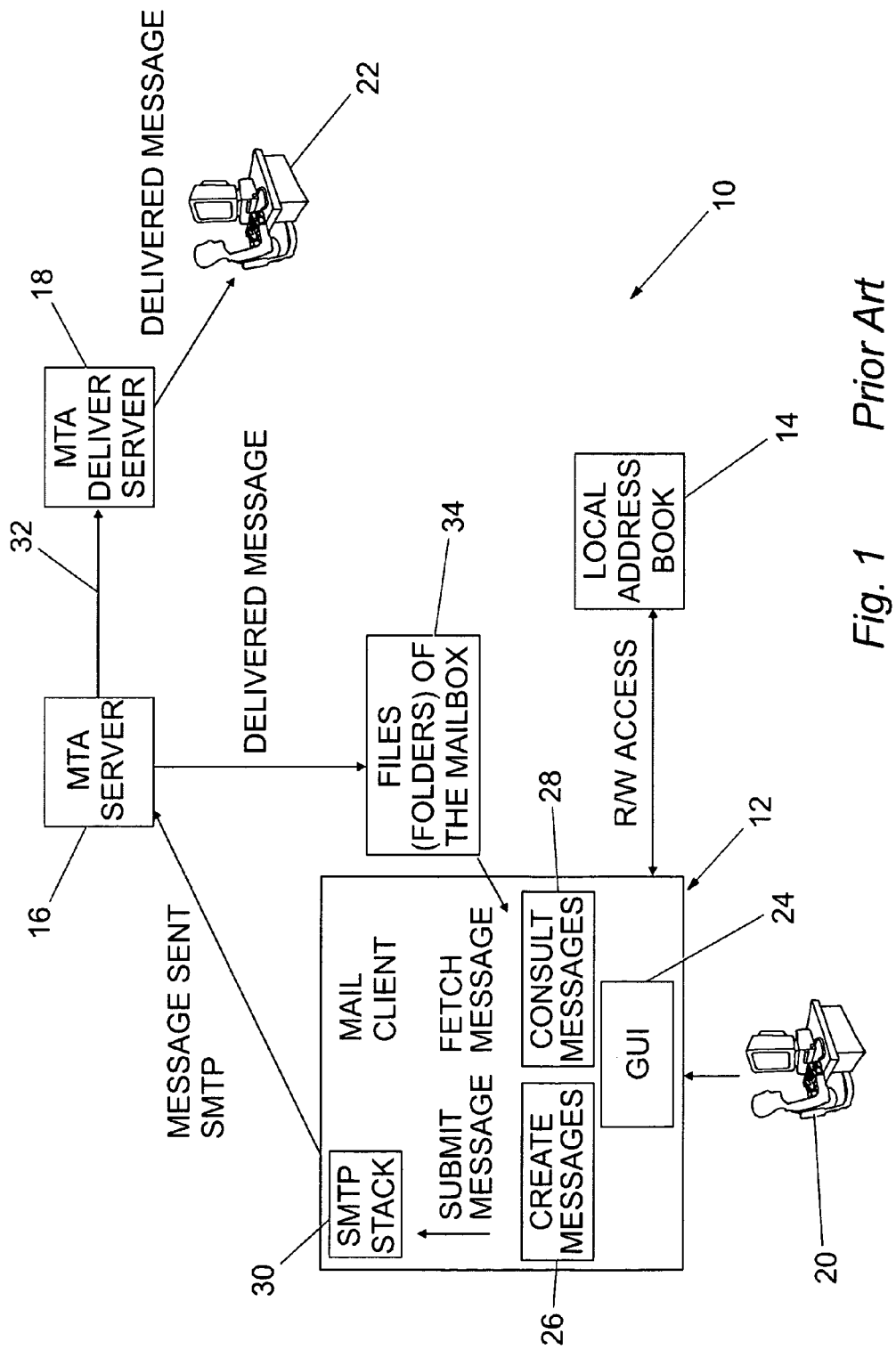
FIG. 1 shows a schematic of a prior art email system.

Throughout the figures, like reference numerals refer to like items.

Referring to FIG. 1, a prior art email system 10 comprises an email client 12, an address store 14, at least one Mail Transfer Agent (MTA) server 16 and a MTA delivery server 18. The email client 12 is operated by an originating user 20 and the MTA delivery server 18 delivers messages to a recipient 22, usually by way of an additional email client (not shown).

The email client 12 comprises a Graphical User Interface (GUI) 24 which allows the originating user 20 to operate the email client 12. The GUI 24 enables a number of processes to be accessed including a create message process 26 and a read (consult) message process 28.

The email standard RFC2822 defines the formatting of a message as well as the information that should be appended during the propagation of messages through a network. In particular, RFC2822 defines a message identifier header field, a trace header field and a reference header field.

The message identifier field, sometimes written msg-id or message-id, must be present in an email message and provides a unique identifier for a particular message.

Mail transfer agents append the trace header field to a message as it propagates through a network. Typically, the trace field contains information relating to the receipt of the message from another computer (usually a MTA), such as, name or Internet Protocol (IP) address of sending and receiving computer, and date and time of receipt.

The reference header field contains information about messages from which the present message depends. These are usually termed "parent" messages. Any message that is forwarded or replied to has its msg-id appended to the references header field. Specifically, the reference header field contains the information contained in the reference header field of the parent message and the msg-id of the parent message.

When the create message process 26 is instructed by the originating user 20 to send a message, the message is formatted according to Simple Mail Transfer Protocol (SMTP) standards and then delivered to a SMTP stack 30. If the MTA server 16 is available, the message or messages are submitted by the SMTP stack 30 to the MTA server 16. If the MTA server 16 is unavailable, the SMTP stack 30 queues the message or messages until the MTA server 16 can be contacted. Once the MTA server 16 has received the message, the message will be forwarded as appropriate through a network 32, which is usually the Internet, until it reaches the MTA delivery server 18. The recipient 22 may then download the message from the MTA delivery server 18 and access its contents.

The read message process 28 displays messages to the originating user 20 from a mailbox 34. The mailbox 34 downloads any message from the network 32 for the originating user 20. In this context, a received message is one that is downloaded from the network 32 for the user 20.

It should be appreciated that a "sent message" may include a message in the process of being sent and a "received message" may include a message in the process of being received.

Figure 2:
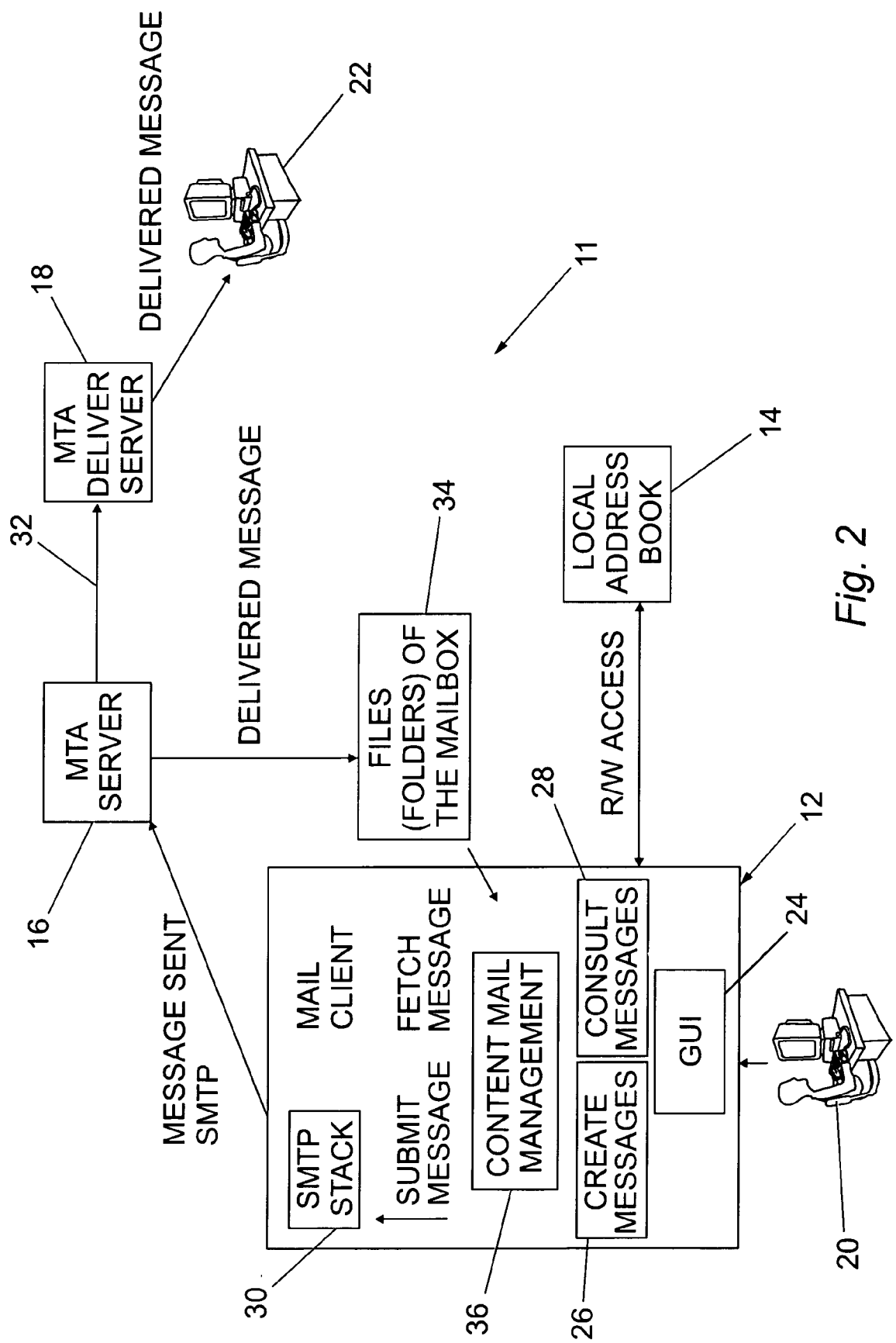
FIG. 2 shows a schematic of an email system comprising an email management system of the present invention.

Referring to FIG. 2, in accordance with the present invention, the email client 12 comprises a content management system 36. The create message process 26 delivers sent messages to the content management system 36. The content management system 36 updates a control table 40 (FIG. 3) with information from the sent message. In this example, the control table 40 has the following control fields:

(a) message identifier (msg-id)—populated by the unique identifier code as provided for by the standards set out in RFC2822;
(b) list of recipients;
(c) status—indicates whether the message, as identified by the msg-id field, has been replied to;
(d) content modified—indicates if the original message content has been modified; and
(e) check date—sets a deadline response date for which a reply is due.

It should be appreciated that other control fields may be used depending on the information that is required by the system.

The control table 40 is updated with the msg-id of the sent message in the msg-id field, the list of recipients in the list of recipients field and a due date in the check date field.

Once the control table 40 has been updated, the content management system 36 submits the message to the SMTP stack 30. The SMTP stack 30 then delivers the message to the MTA server 16 as described previously.

The read message process 28 now receives messages from the content management system 36, which in turn receives messages from the mailbox 34. When the content management system 36 receives a received message from the mailbox 34, the header fields of the received message are checked. If the received message is related to a sent message in the control table 40, information is extracted from the received message and recorded in the control table 40.

The content management system 36 compares received messages with the information stored in the control table 40. In particular, the recipients fields, the trace header fields and references header field are examined for recipient addresses and msg-ids of messages already in the control table 40. Where matches are found, the control table 40 is updated with information about the received message and, if necessary, the matching message is updated to show that a reply has been found.

In this context, the recipients fields include any fields containing addresses for which a sent message should be delivered. For example, the list of recipients fields could include a "TO" field, a "CC" field and a "BCC" field.

The content management system 36 also monitors information in the control table 40 periodically. In this example, a check date field is included in the control table 40. The content management system 36 compares the current date and time with the check date and time, as well as checking the status, for each message in the control table 40. If a check date is overdue and the status field indicates a reply is still required from at least some recipients, a reminder message is automatically sent to the recipients who have not yet replied.

Figure 4:
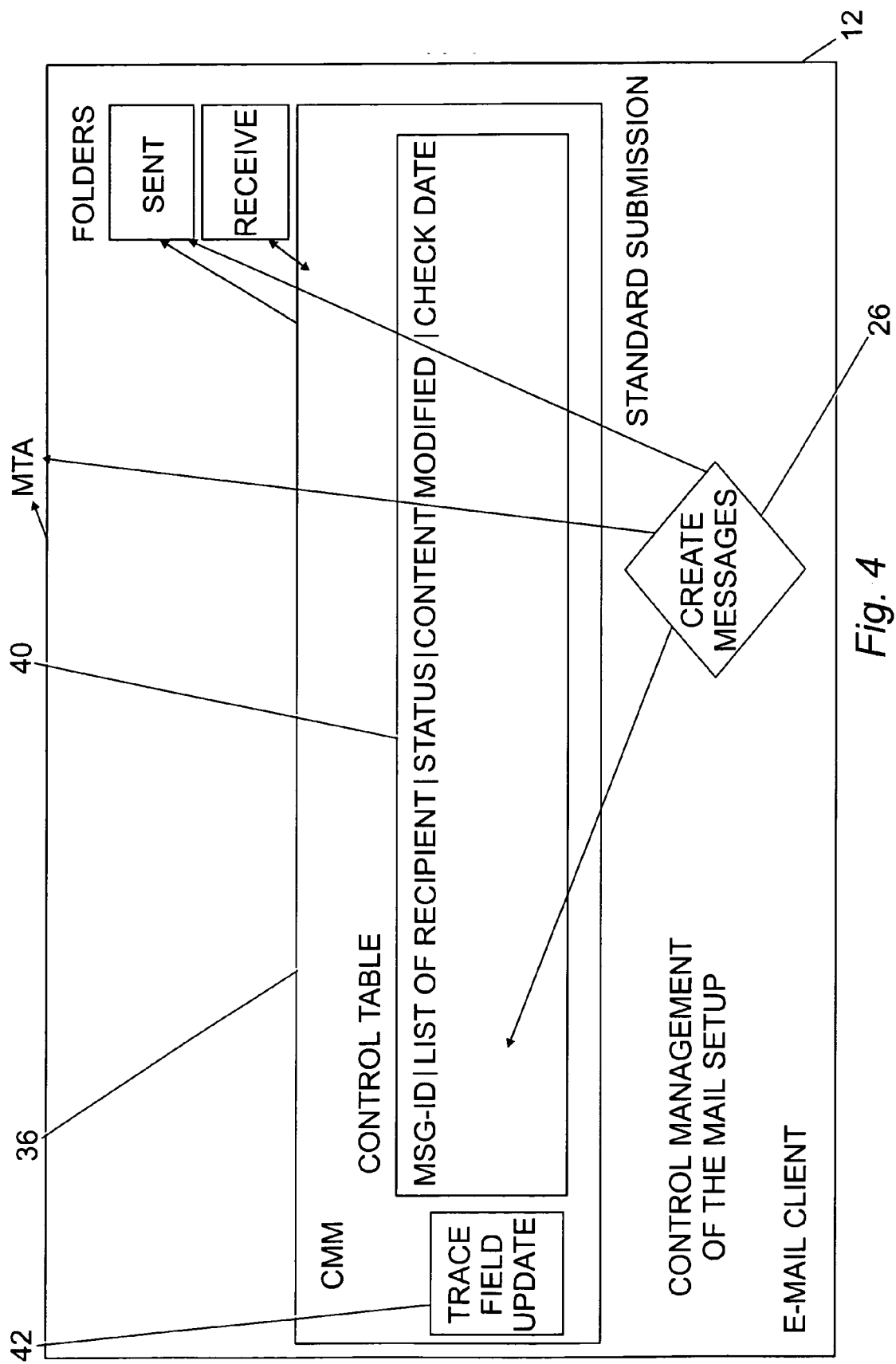
FIG. 4 shows a schematic of an embodiment of an email client of the present invention.

Referring to FIG. 4, an embodiment of the email client 12 of the present invention is shown in more detail. The content management system 36 includes the control table 40 and a trace field update 42. The trace field update 42 inserts and updates information from received and sent messages to the control table 40.

Figures 3, 5:
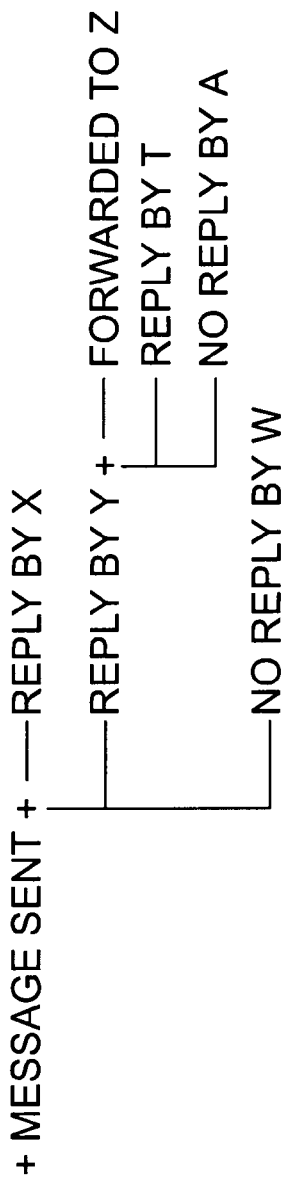
FIG. 3 shows an embodiment of a control table of the present invention.
FIG. 5 shows a representation of email messages organised according to the present invention.

Referring to FIG. 5, an example of a hierarchical organization of messages according to the present invention is shown. A received message which is identified as being related to a sent message is shown as a child. It is also possible to identify if the message has been forwarded prior to receiving a reply by analyzing the references field. As mentioned previously, the references field contains all the msg-ids of parent messages, making it possible to organize messages according to hierarchy. Furthermore, by combining information from the control table 40 relating to the status of each message with the organized messages, a readily identifiable and accurate picture of the message history is created.

A user of the present invention does not require that recipients of messages also are users of the present invention. Email message header fields which are defined by the RFC 2822 standard are used exclusively to track and monitor message responses. Therefore any email client will provide information to enable the present invention natively.

Improvements and modifications may be incorporated without departing from the scope of the present invention.

The invention claimed is:

1. A method of managing email messages comprising the steps of:
   on a computing device, sending at least one sent message having a plurality of sent message control fields, wherein at least one of the sent message control fields includes a message identification field;
   storing information in a control table, wherein the storing comprises storing information from at least one of the plurality of sent message control fields of the at least one sent message, wherein the storing further comprises storing information related to the message identification field of the sent message,
   on a computing device, receiving the at least one sent message and sending at least one response message having a plurality of response message control fields, wherein at least one of the response message control fields includes a message identification field;

storing, in the control table, information related to the response message from recipients of the at least one sent message, the information related to the response message including a deadline response date and/or time and a status indicating whether a response has been received;

comparing information stored in the control table from at least one of the plurality of sent message control fields with information stored in the control table from at least one of the plurality of response message control fields;

identifying matches between the information stored in the control table from at least one of the plurality of sent message control fields and information stored in the control table from at least one of the plurality of response message control, wherein a match indicates that the at least one response message relates to the at least one sent message, wherein the sent message and the response message each have a unique message identification, and wherein the response message relates to the sent message where the message identification of the response message includes the message identification of the sent message in one of the plurality of response message control fields;

after storing in the control table information related to the response message, delivering the response message to at least one recipient;

organizing the at least one response message identified in the information comparing step according to at least one of the plurality of response message control fields;

displaying the at least one sent message and the at least one response message based on the step of organizing the at least one response message, wherein the at least one sent message and the at least one response message are displayed in a hierarchical tree structure in which the response message is shown as a child of the sent message to which the response message is related; and periodically monitoring information stored in the control table, wherein the periodic monitoring includes comparing a current date and time with the deadline response date and checking a status of each message in the control table, where the status indicates a response has not been received, and automatically sending a reminder message to recipients whose response is required and who have not responded.

2. The method of claim 1, wherein the plurality of sent fields are email message fields as defined in the RFC 2822 standard.

3. The method of claim 1, wherein the plurality of response message control fields are email message fields as defined in the RFC 2822 standard.

4. The method of claim 1, wherein at least one of the sent fields includes a list of recipients field and wherein the step of storing information comprises storing information relating to the list of recipients field.

5. The method of 1, further comprising the step of updating stored information of the at least one sent message if the at least one response message is identified as relating to the at least one sent message.

6. The method of claim 1, wherein at least one of the plurality of response message control fields is a reference field and the at least one of the plurality of response message control fields used for organizing is the reference field.

7. A memory that stores a computer program product which when executed by a computer system, causes the computer system to manage email messages, the managing including:

sending at least one sent message having a plurality of sent message control fields;

storing information in a control table, wherein the storing comprises storing information from at least one of the plurality of sent message control fields of the at least one sent message, receiving the at least one sent message and sending at least one response to the at least one sent message, the response having a plurality of response message control fields, wherein at least one of the response message control fields includes a message identification field;

storing in the control table information related to the response from recipients of the at least one sent message, the information related to the response including a deadline response date and/or time and a status indicating whether a response has been received;

comparing information stored in the control table with information from at least one of the plurality of response message control fields;

identifying matches between the information stored in the control table and information from at least one of the plurality of response message control fields, wherein a match indicates that the at least one response message relates to the at least one sent message;

wherein the sent message and the response message each have a unique message identification, and wherein the response message relates to the sent message where the message identification of the response message includes the message identification of the sent message in one of the plurality of response message control fields;

after storing, in the control table, information related to the response message, delivering the response message to at least one recipient;

organizing the at least one response message identified in the information comparing step according to at least one of the plurality of response message control fields;

displaying the at least one sent message and the at least one response message based on the step of organizing the at least one response message, wherein the at least one sent message and the at least one response message are displayed in a hierarchical tree structure in which the response message is shown as a child of the sent message to which the response message is related; and periodically monitoring information stored in the control table, wherein the periodic monitoring includes comparing a current date and time with the deadline response date and checking a status of each message in the control table, where the status indicates a response has not been received, and automatically sending a reminder message to recipients whose response is required and who have not responded.

8. A computer-implemented system comprising:

a computer system including a memory; and an email client storable in the memory and executable by the computer system, the email client including an email content management system, the email content management system being configured to:

receive a sent message and update a control table with information from the sent message, wherein the information includes information related to the sent message having a plurality of sent message control fields, and information related to a response from recipients of the sent message, and wherein the information related to the response includes a deadline response date and/or time and a status indicating whether a response has been received;

compare information stored in the control table with a response message having a plurality of response message control fields;

identify matches between the information stored in the control table and information from at least one of the plurality of response message control fields, wherein a match indicates that the at least one response message relates to the at least one sent message; and wherein the sent message and the response message each have a unique message identification, and wherein the response message relates to the sent message where the message identification of the response message includes the message identification of the sent message in one of the plurality of response message control fields;

deliver the response message to at least one recipient after storing the information related to the response message in the control table;

organize the response message identified as being related to the sent message according to at least one of the plurality of response message control fields;

display the sent message and the response message based on the organizing, wherein the sent message and the response message are displayed utilizing a hierarchical tree structure in which the response message is shown as a child of the sent message to which the response message is related;

periodically monitor information stored in the control table, wherein the periodic monitoring includes comparing a current date and time with the deadline response date and checking a status of each message in the control table, where the status indicates a response has not been received; and automatically send a reminder message to recipients whose response is required and who have not responded.

9. The computer-implemented system of claim 8, wherein the plurality of sent fields are email message fields as defined in the RFC 2822 standard.

10. The computer-implemented system of claim 8, wherein the plurality of response message control fields are email message fields as defined in the RFC 2822 standard.

11. The computer-implemented system of claim 8, wherein at least one of the plurality of sent fields includes a list of recipients field and the email content management system stores the list of recipients field.

12. The computer-implemented system of claim 8, wherein the email content management system updates the stored information of the sent message if the response message is identified as relating to the sent message.

13. The computer-implemented system of claim 8, wherein at least one of the plurality of response message control fields is a references field and the at least one response message control field used for organizing is the references field.

14. The computer-implemented system of claim 8, further comprising an execution environment for running an application and the email client including the email content management system.

15. The method of claim 1, further comprising:
identifying whether the sent message has been forwarded prior to receiving a reply.

16. The memory of claim 7, wherein the managing further comprises:
identifying whether the sent message has been forwarded prior to receiving a reply.

17. The computer-implemented system of claim 8, wherein the email content management system is further configured to:
identify whether the sent message has been forwarded prior to receiving a reply.

* * * * *